United States Patent [19]

Serafini et al.

[11] 3,745,149

[45] July 10, 1973

[54] PREPARATION OF POLYIMIDES FROM MIXTURES OF MONOMERIC DIAMINES AND ESTERS OF POLYCARBOXYLIC ACIDS

[75] Inventors: Tito T. Serafini, Middleburg Heights; Peter Delvigs, Fairview Park; George R. Lightsey, Brookpark, all of Ohio

[73] Assignee: The United States of America as represented by the Administrator of the National Aeronautics and Space Administration, Washington, D.C.

[22] Filed: Sept. 29, 1971

[21] Appl. No.: 184,960

[52] U.S. Cl. ........ 260/65, 117/161 P, 117/161 UN, 117/228, 161/214, 161/227, 260/30.2, 260/30.8 DS, 260/32.6 N, 260/33.4 R, 260/33.6 R, 260/47 CP, 260/78 TF, 260/78 UA
[51] Int. Cl. ............................................ C08g 20/32
[58] Field of Search .................... 260/47 CP, 78 TF, 260/78 UA, 65

[56] References Cited
UNITED STATES PATENTS

| 3,575,924 | 4/1971 | Bargain .............................. 260/47 |
| 3,576,691 | 4/1971 | Meyers .............................. 156/309 |
| 3,632,428 | 1/1972 | Lubowitz et al. ................... 117/161 |
| 3,647,529 | 3/1972 | Lubowitz et al. ................... 117/161 |

Primary Examiner—William H. Short
Assistant Examiner—L. L. Lee
Attorney—N. T. Musial, J. R. Manning et al.

[57] ABSTRACT

Polyimides having high thermal and oxidative stability are prepared by the reaction, with application of heat, of a mixture of monomers comprising (a) a dialkyl or tetraalkyl ester of an aromatic tetracarboxylic acid, (b) an aromatic diamine, and (c) a monoalkyl or dialkyl ester of a dicarboxylic acid wherein the ratio of a:b:c is $n:(n+1):2$, wherein $n$ has a value of from 1 to 20. The mixture of monomers is prepared in a 30 to 70 percent by weight solution of an organic solvent, a substrate impregnated with the solution and heated at 50° to 205°C to remove said solvent and form a low molecular weight prepolymer, and thereafter heated at 275° to 350°C to cure to a high molecular weight polyimide. In a specific embodiment, graphite fiber is impregnated with a solution of 60 percent by weight of a mixture of 2,5-dicarbomethoxyterephthalic acid, methylenedianiline, and 5-norbornene-2,3-dicarboxylic acid monomethyl ester in dimethyl formamide, the impregnated fiber heated at 50° to 120°C to remove solvent, and thereafter heated at about 205°C to form imidized prepolymer and then at 315°C to form a high molecular weight thermally stable polyimide.

11 Claims, No Drawings

PREPARATION OF POLYIMIDES FROM MIXTURES OF MONOMERIC DIAMINES AND ESTERS OF POLYCARBOXYLIC ACIDS

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

This invention relates to polyimide resins which are noted for their high thermal and oxidative stability, high strength at elevated temperatures, and which exhibit many other outstanding physical and chemical properties especially useful in high temperature applications. Such polyimides have been particularly useful in applications such as jet engine compressor components, for example, blades, vanes, air seals, air splitters, and engine casing parts. They are generally useful in applications where high strength and temperature capabilities are required at temperatures of up to 550°F. Polyimide resins, while possessing the attractive high temperature properties, have not been utilized as fully as might otherwise be possible because the economics of processing conditions have been less than favorable. Special handling requirements in the processing stage have made their use economically prohibitive for many applications.

2. Description of the Prior Art

Polyimides have been prepared according to the practice in which intermediate polyamide acids are first synthesized. Generally these polyamide acids are of two types, high molecular weight and end-capped low molecular weight. Both these types of pre-cursors have certain limitations such as limited solubility in organic solvents and limited shelf life due to solvolytic degradation. The thermal stability of the latter type precursor is further limited due to the non-aromatic nature of end-caps employed.

Thus, in the past, condensation type aryl polyimides have been produced by reacting an aryl dianhydride and an aryl diamine in an aprotic solvent. Initial reaction produces a polyamide acid through chain extension, or polymerization, requiring a reaction time of up to 4 hours. The polyamide acid which is formed is unstable and must be kept in solution, hermetically sealed and refrigerated if not utilized within a few hours. Special handling and storage greatly increases the ultimate cost to the user. Such polyamide acids require curing by heat treatment to the final polyimide for periods of from 5 to 16 hours and such curing results in the evolution of appreciable amounts of volatile materials.

U.S. Pat. No. 3,528,950 discloses a method for preparing high molecular weight polyimides without the necessity of forming the polyamide acids. In U.S. Pat. No. 3,528,950 a low molecular weight prepolymer is prepared by reacting a poly-functional amine, a poly-functional anhydride, and an end-capping monoanhydride of the formula:

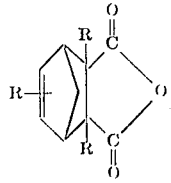

where R represents hydrogen or a lower alkyl, by refluxing for a period of 18 hours. Such treatment yields two polyimide prepolymers, one of a higher molecular weight and a second of a lower molecular weight, which are subsequently blended in dry-powder form. The blend of prepolymer is then heated to a temperature of 200° to 350°C to form polyimide macromolecules. While utilization of such prepolymers eliminates the instability problems that are encountered with the polyamic acid approach, the preparation of the prepolymer is very time-consuming and requires the separate step of blending the two prepolymers that are formed in the refluxing step prior to heating to cure to the macro-molecular polyimide.

SUMMARY OF THE INVENTION

According to this invention, macro-molecular polyimides are prepared from mixtures of monomers of (a) a dialkyl or tetraalkyl ester of an aromatic tetracarboxylic acid, (b) an aromatic diamine, and (c) a monoalkyl or dialkyl ester of a dicarboxylic acid, wherein the ratio of $a:b:c$ is $n : (n+1) : 2$, wherein $n$ is an integer of from 1 to 20. The monomers are mixed in an organic solvent and comprise 30 to 70 percent by weight of the solution. The solution of monomers has excellent long-term shelf life. The monomers are non-reactive at room temperature but react at elevated temperatures to form prepolymers, and when cured at high temperatures form macromolecular polyimides having molecular weights of at least 10,000. Such polyimides have excellent high temperature oxidative and thermal stability and outstanding mechanical properties.

DETAILED DESCRIPTION OF THE INVENTION

According to this invention, the high temperature macromolecular polyimides are synthesized from a mixture of monomer compounds of the following formulas:

(a) 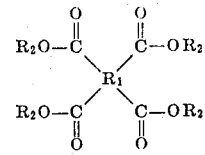

wherein $R_1$ is a tetravalent aryl radical and $R_2$ is alkyl, preferably lower alkyl of one to four carbon atoms, or hydrogen, at least two of $R_2$ being alkyl;

(b) $H_2N-R_3-NH_2$ wherein $R_3$ is a divalent aryl radical; and (c) 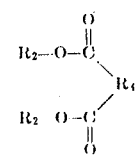

wherein $R_2$ is defined as in *a* above, and wherein at least one of $R_2$ in *c* is alkyl, and $R_4$ is a divalent radical of the formulas:

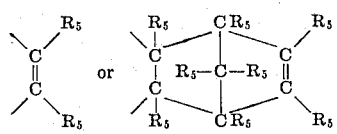

wherein $R_5$ is hydrogen or lower alkyl of one to four carbon atoms, and is preferably methyl.

The esters of the tetracarboxylic acid defined in *a* above may be readily prepared according to the known methods from the corresponding dianhydrides of the formula:

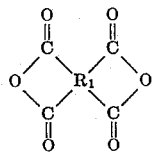

wherein $R_1$ is as defined above. Representative of the many dianhydrides which may be employed include pyromellitic dianhydride, 3,3′, 4,4′-benzophenone tetracarboxylic dianhydride, 2,3,6,7-naphthalene tetracarboxylic dianhydride, 1,2,5,6-naphthalene tetracarboxylic dianhydride, 2,2′,3,3′-diphenyl tetracarboxylic dianhydride, bis (3,4-dicarboxyphenyl) sulfone dianhydride, 1,4,5,8-naphthalene tetracarboxylic dianhydride.

Representative diamines of the type defined in *b* above are benzidine, 4,4′-methylenedianiline, 4,4′-thiodianiline, 4,4′-oxydianiline, 4,4′-diaminodiphenyl sulfone, m-phenylenediamine, p-phenylenediamine.

The mono- or dialkyl esters of the dicarboxylic acid defined in *c* may be prepared readily from the corresponding anhydride of the formula:

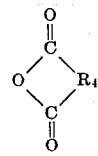

wherein $R_4$ is as defined above. Representative of such anhydrides include maleic anhydride, citraconic anhydride, 5-norbornene-2,3-dicarboxylic anhydride, methyl-5-norbornene-2,3-dicarboxylic anhydride.

An organic solvent is employed to dissolve the esters and diamine. The solvent is one of which must not react with the amines or esters during the processing conditions. Representative examples of suitable solvents are N,N-dimethylformamide, N,N-dimethylacetamide, dimethyl sulfoxide, N-methylpyrrolidone, aliphatic alcohols, aliphatic alcohol-ethers, and alkylbenzenes such as xylene. Mixtures of two or more of such solvents may be employed.

The solutions of esters and diamine of the present invention are very stable and have an extremely long shelf life. They do not require any special packaging or storage conditions.

The solutions of mixtures of esters and diamine of the present invention may be reacted to form prepolymers of the types described in U.S. Pat. No. 3,528,950 by heating the solutions at temperatures of 50°C to 205°C thereby forming low molecular weight end-capped prepolymers of the formula:

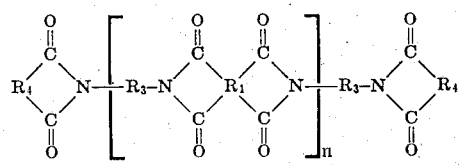

wherein $R_1$, $R_3$, $R_4$ and *n* are as defined above. The molecular weight of such end-capped prepolymers can be adjusted to desired values by varying the value of the number *n* between 1 and 20 provided molar ratio $nR_1$ : $(n+1)R_3$ : $2R_4$ is maintained, as indicated above, for the relationship of a:b:c. The prepolymers have an average molecular weight in the range of 400 to 10,000. Such end-capped prepolymers, as is known, are stable below 275°C. When heated at from about 275°C to about 350°C the endcapped portion of the molecule becomes reactive and chain extension and cross-linking occur to form high molecular weight thermally stable polyimides.

The exact nature of the polymerization process by which the high molecular weight polyimides having the structure:

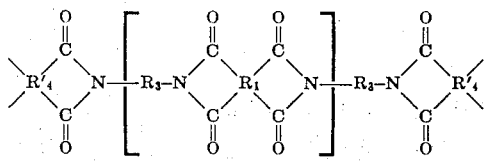

are formed, is not known. It is believed that $R'_4$ is a radical formed during the cross-linking of the end-caps.

One of the important advantages of the present invention is that there is no need to form the polyimide prepolymer as in U.S. Pat. No. 3,528,950 prior to heating at curing temperature to form the high molecular weight polyimides. Thus, the solution of monomer mixtures of the present invention may be used to impregnate a substrate which is then heated to a cure temperature of 275° to 350°C to obtain the high molecular weight polyimide within 30 minutes to an hour. According to the process of this invention, the polymerization to the high molecular weight polyimide can be accomplished within a much shorter period of time than previously known processes. In addition, there is no volatile material evolved during the final cure.

The following examples describing certain representative embodiments of this invention will serve to further illustrate the nature of this invention. It is to be understood that the examples are merely illustrative, and intended to enable those skilled in the art to practice the invention in all of the embodiments flowing therefrom and do not in anyway limit the scope of the invention defined in the claims.

EXAMPLE 1

A solution of 5.10 g of 5-norbornene-2,3-dicarboxylic acid monomethyl ester in 6.00 g of anhydrous N,N-dimethylformamide is added dropwise at room temperature to a stirred solution of 6.02 g of 4,4'-methylenedianiline in 4.69 g of dimethylformamide. After the addition is completed, 4.91 g of solid 2,5-dicarbomethoxyterephthalic acid is added. The mixture is stirred at room temperature for 2 hours. The solid dissolves during this time. The resulting solution contains 60 percent solids by weight, and will yield an imidized end-capped prepolymer having a molecular weight of 1,000. The value of $n$ is 1.342.

Approximately 5 g of graphite fiber are impregnated with 7.65 g of the solution by first winding the graphite fiber onto a mandrel, then applying the solution evenly to the fiber with a small brush. The impregnated fiber is then heated at 50°C for 1 hour on the mandrel to removed most of the dimethylformamide solvent. The impregnated fiber is then heated in a 120°C oven for 10 minutes to further reduce the solvent content to 5 to 10 percent by weight. The impregnated fiber at this point is flexible, but not tacky, and can be easily cut and shaped into various forms.

Six plys of impregnated fiber ½ by 4⅞ inches are cut and then heated for 1 hour in a 205°C oven. During this heating period the monomers in the fiber react to form the imidized end-capped prepolymer. The volatile products of this reaction, along with the last traces of solvent, are driven off.

A separator film of aluminum foil is placed on the top and bottom of the stack of impregnated fiber, and the impregnated fiber inserted into a ½ by 5 inch mold preheated to 315°C. The mold is closed and contact pressure maintained for 50 seconds, then 650 psi is applied. After 30 minutes at 650 psi and 315°C, the pressure is released and the mold slowly cooled to room temperature.

The resulting polyimide-graphite fiber composite is essentially void-free, and exhibits mechanical properties comparable to composites made from conventional amide-acid prepolymers, such as a room temperature interlaminar shear strength of 8,000 psi (measured according to Method D-2344 of the American Society of Testing and Materials).

EXAMPLE 2

Following the procedure of Example 1, a solution of 5-norbornene-2,3-dicarboxylic acid monomethyl ester, 4,4'-thiodianiline, and 2,5-dicarbomethoxyterephthalic acid is made wherein the value of $n$ is 2,492 and yielding an imidized end-capped prepolymer having a formulated molecular weight of 1,500. The impregnated fiber using the monomeric solution of this example is molded into a composite in the same manner as in Example 1. The composite is essentially void-free and exhibits excellent mechanical properties, such as a room temperature interlaminar shear strength of 8000 psi.

EXAMPLE 3

Following the procedure of Example 1, a solution of 5-norbornene-2,3-dicarboxylic acid monomethyl ester, 4,4'-methylenedianiline, and 2,5-dicarbomethoxyterephthalic acid, wherein $n$ has a value of 3.974, is prepared to give an imidized end-capped prepolymer having a formulated molecular weight of 3,000. Impregnated graphite fiber is prepared in the same manner as in Example 1 except that the imidization step at 205°C is eliminated. The compounds in the impregnated fiber react to form imidized end-capped prepolymer in the mold during the initial phase of the molding cycle at 320°C, and further polymerize through the reactive end-caps to the high molecular weight polyimides. As in the previous examples, there are essentially no voids and the composite exhibits excellent mechanical properties.

EXAMPLE 4

A mixture of 8.82 g of 5-norbornene-2,3-dicarboxylic acid monomethyl ester, 13.75 g of 4,4'-methylenedianiline, and 18.13 g of 3,3',4,4'-benzophenonetetracarboxylic acid dimethyl ester is dissolved in 40.70 g of anhydrous methanol by stirring at room temperature. The solids dissolved within 30 minutes. The resulting solution contains 50 percent solids by weight, and will yield an imidized end-capped prepolymer having formulated molecular weight of 1,500. The value of $n$ is 2.087.

Approximately 60 g of graphite fiber are impregnated with the above solution by first winding the graphite fiber onto a mandrel, then applying the solution evenly to the fiber with a brush. The impregnated fiber is then dried at 50°C for 1 hour on the mandrel to reduce the solvent content to 5 to 10 percent by weight. The impregnated fiber at this point is easily cut and shaped into various forms.

Twelve plys of impregnated fiber 3 by 9 15/16 inches are cut and then heated for 4 hours in a 205°C oven. During this heating period the monomers in the fiber react to form the imidized end-capped prepolymer. The volatile products of this reaction, along with the last traces of solvent, are driven off.

A separator film of aluminum foil is placed on the top and bottom of the stack of impregnated fiber, and the impregnated fiber inserted into a 3 by 10 inch mold preheated to 315°C. The mold is closed and contact pressure maintained for 40 seconds, then 500 psi pressure is applied. After 30 minutes at 500 psi and 315°C, the pressure is released and the mold slowly cooled to room temperature.

The resulting polyimide-graphite fiber composite is essentially void-free, and exhibits excellent mechanical properties, such as a room temperature interlaminar shear strength of 13,000 psi.

What is claimed is:

1. A composition of matter consisting essentially of a mixture of compounds of the formulas:

(a) 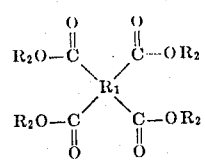

wherein $R_1$ is a tetravalent aryl radical and $R_2$ is alkyl or hydrogen; and at least two $R_2$ are alkyl;

(b) $H_2N-R_3-NH_2$ wherein $R_3$ is a divalent aryl radical; and (c) 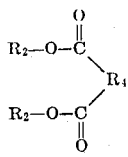

wherein $R_2$ is as defined in (a) and at least one $R_2$ is alkyl, and $R_4$ is divalent radical of the formula:

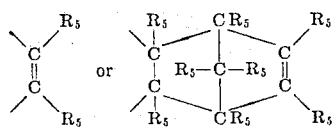

wherein $R_5$ is hydrogen or lower alkyl; and wherein the molar ratio of $a{:}b{:}c$ is $n : (n+1) : 2$, wherein $n$ has a value from 1 to 20.

2. A composition of matter as claimed in claim 1 wherein said mixture is dissolved in an organic solvent which is inert to the reactant mixture and comprises from 30 percent to 70 percent by weight of the solution.

3. A composition of matter as claimed in claim 2 wherein $R_4$ is

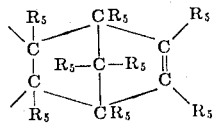

wherein $R_5$ is hydrogen or lower alkyl.

4. A composition of matter as claimed in claim 3 wherein $R_5$ is methyl.

5. A composition of matter as claimed in claim 2 wherein $a$ is solid 2,5-dicarbomethoxyterephthalic acid; $b$ is 4,4'-methylenedianiline; and $c$ is 5-norbornene-2,3-dicarboxylic acid monomethyl ester.

6. A composition of matter as claimed in claim 1 wherein $a$ is 2,5-dicarbomethoxyterephthalic acid; $b$ is 4,4'-thiodianiline; and $c$ is 5-norbornene-2,3-dicarboxylic acid monomethyl ester.

7. A composition of matter as claimed in claim 2 wherein $a$ is 3,3',4,4'-benzophenonetetracarboxylic acid dimethyl ester; $b$ is 4,4'-methylenedianiline; and $c$ is 5-norbornene-2,3-dicarboxylic acid monomethyl ester.

8. A process for preparing polyimides which comprises reacting, by application of heat, a mixture of compounds of the formulas:

(a) 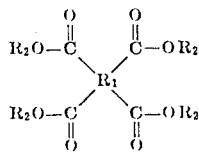

wherein $R_1$ is a tetravalent aryl radical and $R_2$ is alkyl or hydrogen, and at least two of $R_2$ are alkyl;

(b) $H_2N-R_3-NH_2$ wherein $R_3$ is a divalent aryl radical; and (c) 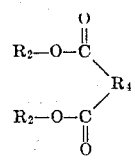

wherein $R_2$ is as defined in $a$ and at least one $R_2$ is alkyl, and $R_4$ is a divalent radical of the formula:

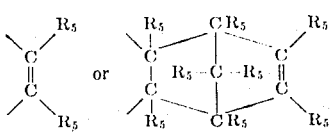

wherein $R_5$ is hydrogen or lower alkyl, and wherein the molar ratio of $a{:}b{:}c$ is $n : (n+1) : 2$, wherein $n$ has a value of 1 to 20, and wherein said application of heat raises the temperature of said reaction mixture to at least 205°C to obtain polyimide prepolymers having an average molecular weight in the range of 400 to 10,000.

9. A process as claimed in claim 8 wherein the reaction products are heated to a temperature of from about 275°C to about 350°C to obtain polyimide polymers having an average molecular weight in excess of 10,000.

10. A process for preparing polyimides which comprises heating a solution of solvent and from about 30 percent to about 70 percent by weight of a mixture of compounds of the following formulas:

(a) 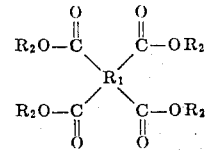

wherein $R_1$ is a tetravalent aryl radical and $R_2$ is alkyl or hydrogen; and at least two $R_2$ are alkyl;

(b) $H_2N-R_3-NH_2$ wherein $R_3$ is a divalent aryl radical; and (c)

wherein $R_2$ is as defined in *a* and at least one $R_2$ is alkyl, and $R_4$ is a divalent radical of the formula:

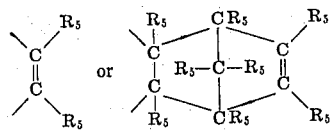

wherein $R_5$ is hydrogen or lower alkyl, and wherein the molar ratio of *a:b:c* is $n : (n+1) : 2$, wherein *n* has a value from 1 to 20, at a temperature from about 50°C to about 120°C to remove said solvent, and thereafter heating at 205°C to obtain polyimide prepolymers having an average molecular weight in the range of 400 to 10,000, said solvent being inert to said mixture.

11. A process as claimed in claim 10 including an additional heating step wherein said prepolymers are heated at temperatures of from about 275°C to 350°C to obtain polyimide polymers having an average molecular weight in excess of 10,000.

* * * * *